United States Patent [19]
Chikuma et al.

[11] Patent Number: 5,138,686
[45] Date of Patent: Aug. 11, 1992

[54] FIBER TYPE WAVELENGTH CONVERTER

[75] Inventors: Kiyofumi Chikuma; Sota Okamoto, both of Saitama, Japan

[73] Assignee: Pioneer Electronic Corporation, Tokyo, Japan

[21] Appl. No.: 667,638

[22] Filed: Mar. 11, 1991

[30] Foreign Application Priority Data

Jul. 17, 1990 [JP] Japan .................. 2-189205

[51] Int. Cl.$^5$ .................. G02B 6/16; G02F 1/37
[52] U.S. Cl. .................. 385/122; 359/328; 359/332; 385/123
[58] Field of Search .................. 307/425–430; 350/96.12, 96.13, 96.14, 96.15, 96.29, 96.30, 96.34; 359/326–332; 385/122, 123

[56] References Cited

U.S. PATENT DOCUMENTS

| | | | |
|---|---|---|---|
| 4,221,981 | 9/1980 | Deserno | 307/425 |
| 4,909,595 | 3/1990 | Okazaki et al. | 350/96.29 |
| 5,022,738 | 6/1991 | Uenishi et al. | 359/328 |
| 5,061,038 | 10/1991 | Chikuma et al. | 359/328 |
| 5,080,507 | 1/1992 | Harada et al. | 385/122 |

*Primary Examiner*—John D. Lee
*Attorney, Agent, or Firm*—Wegner, Cantor, Mueller & Player

[57] ABSTRACT

A fiber type optical wavelength converter comprising a core, and a clad. The core is made of nonlinear optical crystal that converts the primary light or straight polarization of a frequency of $\omega$, which enters and propagates in the direction of the center axis of the core, into a second harmonics having a vibrating surface normal to a vibrating surface of the primary light and having a frequency of $2\omega$. The nonlinear optical crystal also satisfies $n^\omega \geqq n^{2\omega}$ where $n^\omega$ is a refractive index to the primary light and $n^{2\omega}$ is a refractive index to the second harmonics.

6 Claims, 4 Drawing Sheets

FIBER TYPE WAVELENGTH CONVERTER

BACKGROUND OF THE INVENTION

1. Field of the Invention

The present invention relates to an optical fiber type wavelength converter using Cerenkov radiation phase matching.

2. Description of the Prior Art

Wavelength converters have been actively developed, which use nonlinear optical crystal to constitute an optical waveguide passage to guide an optical wave to a minute area, and effectively generate a second harmonics. These wavelength converters are generally classified into two types depending on the methods satisfying phase matching. The first type matches a nonlinear polarization wave excited by the incident light with the phase velocity of the second harmonics wave and executes the phase matching between the guide mode of the fundamental wave, i.e., the incident light and the guide mode of the second harmonics. The other type executes so-called Cerenkov radiation phase matching, i.e., the phase matching between the guide mode of the fundamental wave and the radiation mode of the second harmonics.

An optical wavelength converter is known, which is constituted in the shape of an optical fiber comprising a core of nonlinear optical crystal and a clad surrounding this core and employs the Cerenkov radiation phase matching. This optical wavelength converter is also known as an optical fiber type second harmonics generator (hereinafter referred to as "SHG"). According to the Cerenkov radiation system, it is possible to generate a second harmonics (hereinafter referred to as "SH") whose optical phase is almost automatically matched. The SHG is applied to a shortwave light generator.

As shown in FIG. 1, the shortwave light generator comprises a semiconductor laser 1, a coupling lens 2, an SHG 3 of which core is constituted by nonlinear optical crystal, and an axicon 4. The coupling lens 2 collects and guides the light emitted from the semiconductor laser onto the end face of the SHG 3. The axicon 4 shapes the wavefront of the SH wave, irradiated after conversion done by the optical wavelength converter, to form the SH wave in the form of the parallel flux of light.

FIG. 2 is a conceptual diagram of the SHG 3, which comprises a columnar core 10 and a cylindrical clad layer concentrically surrounding the core 10.

Referring to FIG. 2, when the core 10 whose fundamental wave mode has an effective refractive index N ($\omega$) propagates through the core 10 from the left to the right in the diagram, the nonlinear polarization wave which generates an SH wave also propagates at the same phase velocity C/N ($\omega$) (C: light speed). Suppose that this nonlinear polarization wave generates the SH wave in the direction that forms an angle of $\theta$ with the waveguide direction at the illustrated point A, and after a unit time, the polarization wave likewise regenerates the SH wave in the direction of 8 at the point B. If the SH wave generated at the point A propagates through, for example, the clad layer 20 and reaches the point C after a unit time, and $\theta$ is an angle to make the line AC intersect the line BC at the right angles, the wavefront of the SH wave generated between A and B by the nonlinear polarization wave becomes BC. This means that a coherent SH wave has been generated.

The SH wave generated in this manner propagates in clad mode in which it repeats the full reflection at the boundary between the clad layer 20 and air as shown in FIG. 3, and is emitted from the end of the fiber in a corn shape in the direction determined by $\alpha$. The equiphase wave surface of the wavefront of the thus emitted SH wave is conical with the center axis of the fiber as its axis.

With the shortwave light generator module constituted by the above SHG, it is not desirable that the nonlinear optical crystal used for the core absorbs the light having half the wavelength of the semiconductor laser. However, there is no material of this type found yet which has a large nonlinear polarization constant; such a material has a nonlinear polarization constant of about 100 Pm/V at maximum. Further, the level of the output of the semiconductor laser used for the primary light is as high as 50 to 60 mW, and the coupling efficiency of the light to be coupled by the coupling lens is as high as 40 to 50%. Consequently, the wavelength converting efficiency (power of an SH wave to be emitted/output of the semiconductor laser) is about 0.1% at maximum.

SUMMARY OF THE INVENTION

It is therefore an object of the present invention to provide a fiber type SHG which makes a sufficient use of the performance of a nonlinear material for the core and has a high converting efficiency.

To achieve this object, there is provided a fiber type optical wavelength converter comprising a core, and a clad enclosing the core, whereby the core is made of nonlinear optical crystal that converts the primary light or straight polarization of a frequency of $\omega$, which enters and propagates in a direction of a center axis of the core, into a second harmonics having a vibrating surface normal to a vibrating surface of the primary light and having a frequency of $2\omega$, and that satisfies $n^\omega \geq n^{2\omega}$ where $n^\omega$ is a refractive index to the primary light and $n^{2\omega}$ is a refractive index to the second harmonics.

According to the present invention, the overlap integral of the electric fields of the primary light and secondary light is increased by properly selecting the dielectric main axis and rotating the selected dielectric main axis to the central axial direction of the core, so that an SH wave can be generated at high efficiency.

DETAILED DESCRIPTION OF THE PREFERRED EMBODIMENTS

Preferred embodiments of the present invention will be described below referring to the accompanying drawings.

Figure 1:
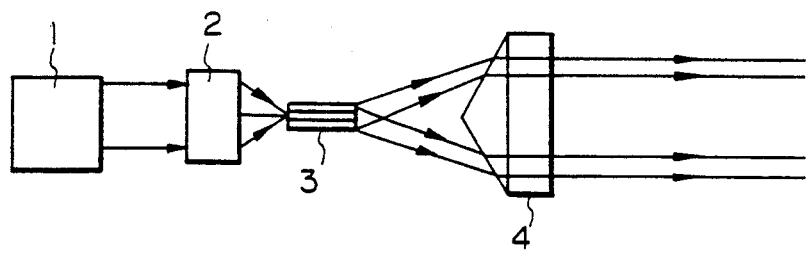
FIG. 1 is a schematic diagram of a shortwave light generator using in SHG.
Figure 2:
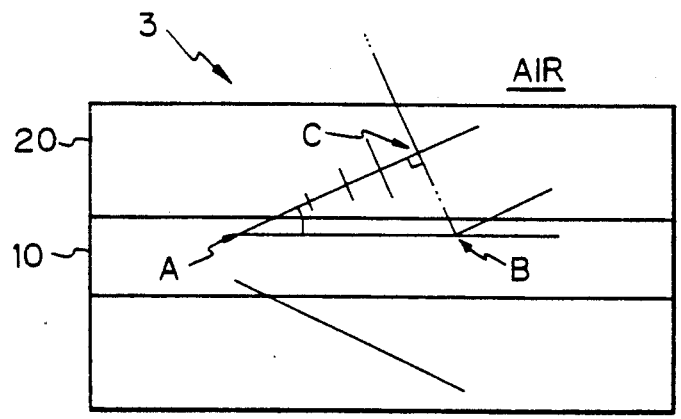
FIG. 2 and FIG. 3 are schematic cross sections of the SHG.
Figure 3:
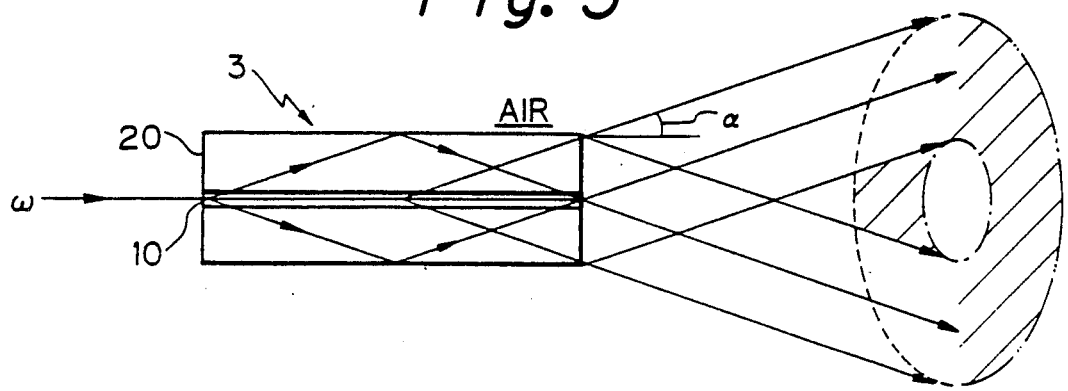
Figure 4:
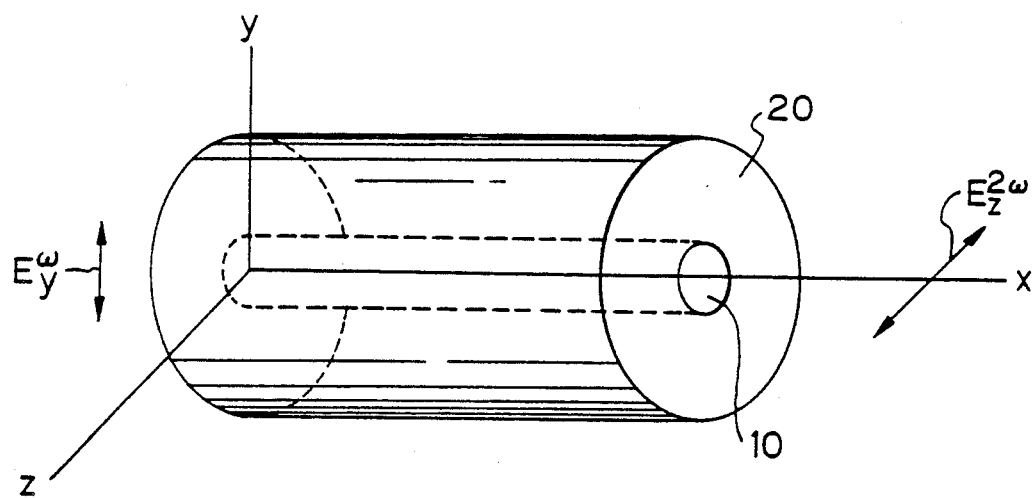
FIG. 4 is a perspective view of an SHG according to the present invention.

The structure of the SHG according to the present invention as shown in FIG. 4 is approximately the same as the one illustrated in FIG. 2. The difference lies in that a core 10 has a specific dielectric constant tensor and a secondary nonlinear polarization tensor. The SHG includes the columnar core 10 made of nonlinear optical crystal, and a cylindrical clad layer 20 enclosing the core 10 concentrically.

The SHG has the following five characteristics.

(1) To form a core using nonlinear optical crystal whose refractive index $n_G^\omega$ to the primary light (a fundamental wave) of the core is larger than a refractive index $n_G^{2\omega}$ to the SH wave.

Considering the presence of the boundary between the clad and the core, with clad diameter set finite as per the actual SHG, an electromagnetic field was analyzed. From the analysis, it was found that the SH wave could be expressed by superposition of discrete modes propagating in the clad. Many equivalent refractive indexes slightly different from one another are present in these modes. Energy is moved to one of these modes which is very close to the propagation velocity of a nonlinear polarization wave, and the SH wave propagates. This is very similar to the SHG in the case of the mode-mode phase matching that matches the SH wave propagating in the core with the waveguided primary light.

In consideration of the influences of the boundary between the core and the clad and the boundary between the clad and the air, the output of the SH wave was analyzed by the following method.

Given that an axis Z is a waveguide direction, a is a core radius, L is a crystal length, and an $LP_{01}$ mode for propagating $\beta$ as a propagation constant is waveguided, a nonlinear polarization PNL to be excited is defined as follows:

$P^{NL} = \epsilon_0 d C J_0(ur)^2 \exp(-i2\beta z)$

C Constant $u^2 = \omega^2 \mu_0 \epsilon_g - \beta^2$ $\epsilon_g$: Dielectric constant of the core Using the dielectric constant $\epsilon_1$ of the crystal and Green's function $G^D(r,r')$ in consideration of the boundaries, an SH wave $E^{2\omega}(r)$ of the core is expressed as follows:

$$E^{2\omega}(r) = i2\omega^2\mu_0\epsilon_0 dC \times \int_{-\infty}^{\infty} \int_0^a G^D(r,r') J_0(ur')^2 r' dr' \times$$

$$\frac{\sin[(2\beta - \lambda)L/2]}{(2\beta - \lambda)} \exp(-i\lambda z) d\lambda$$

Using the Green's function $G(r,r')$ over the whole space and an arbitrary function $A(\lambda)$, $G^D(r,r')$ will be given as follows.

$G^D(r,r') = G(r,r') + A(\lambda) J_0(r\xi) J_0(r'\xi)$ $G(r,r')$ will be expressed as follows.

$$G(r,r') = \begin{cases} H_0^{(1)}(r\zeta) J_0(r'\zeta) & (r > r') \\ H_0^{(1)}(r'\zeta) J_0(r\zeta) & (r < r') \end{cases}$$

where $H_0^{(1)}$ and $J_0$ are the zeroth Hankel function of the first kind and the zeroth Bessel function, and $\zeta^2 = 4\omega^2\mu_0\epsilon_1 - \lambda^2$. The power of the SH wave, $p^{2\omega}$, is obtained by the following equation.

$$p^{2\omega} = 8\pi\omega^3\mu_0\epsilon_0^2 d^2 C^2 \times \int_{-\infty}^{\infty} F(\lambda) \frac{\sin^2[(2\beta - \lambda)L/2]}{(2\beta - \lambda)^2} d\lambda \quad (1)$$

$$F(\lambda) = \text{Real}\left\{ iG(\lambda) \right\} \times \left| \int_0^a J_0(r\zeta) J_0(ur)^2 r dr \right|^2 \quad (2)$$

(i: imaginary number)

The function $G(\lambda)$ can be defined with the boundary conditions. Given that the dielectric constant of the clad is $\epsilon_2$, and the dielectric constant of air is $\epsilon_0$, $\eta$ and $\xi$ are defined as follows:

$\eta^2 = 4\omega^2\mu_0\epsilon_2 - \mu^2$ $\xi^2 = 4\omega^2\mu_0\epsilon_0 - \mu^2$ Further, with functions $A(\lambda)$, $A'(\lambda)$, $B(\lambda)$, $C(\lambda)$, $C'(\lambda)$ and $D(\lambda)$ defined as follows:

$A(\lambda) = \eta N_0(a\zeta) J_1(a\eta) - \zeta N_1(a\zeta) J_0(a\eta)$
$A'(\lambda) = \eta J_0(a\zeta) J_1(a\eta) - \zeta J_1(a\zeta) J_0(a\eta)$
$B(\lambda) = \xi N_0(b\eta) K_1(b\xi) - \eta N_1(b\eta) K_0(b\xi)$
$C(\lambda) = \zeta N_0(a\eta) J_1(a\zeta) - \eta N_1(a\eta) J_0(a\zeta)$
$C'(\lambda) = \zeta N_0(a\eta) N_1(a\zeta) - \eta N_1(a\eta) N_0(a\zeta)$
$D(\lambda) = \xi J_0(b\eta) K_1(b\xi) - \eta J_1(b\eta) K_0(b\xi)$, then, $$G(\lambda) = -\frac{A(\lambda)B(\lambda) + C(\lambda)D(\lambda)}{A'(\lambda)B(\lambda) + C'(\lambda) + D(\lambda)}$$

The function $G(\lambda)$ has a pole $\lambda_j$ of the first order on the real axis, and the power of the SH wave obtained by the equation (1) can be represented by residues of many poles of this kind.

In other words, $G(\lambda)$ is a function having a singularity at $\lambda = \lambda_j (j = 1, 2, \ldots)$, and given that Res $G(\lambda_j)$ is the residue at the singularity, then $$p^{2\omega} = 8\pi^2\omega^3\mu_0\epsilon_0^2 d^2 C^2 \times \sum_j \text{Res}G(\lambda_j) \frac{\sin^2[(2\beta - 2\lambda_j)L/2]}{(2\beta - \lambda_j)^2} \times$$

$$\left| \int_0^a J_0(r\zeta_j) J_0(ur)^2 r dr \right|^2$$

$(\zeta_j^2 = 4\omega^2\mu_0\epsilon_1 - \lambda_j^2)$

This discrete pole is a propagation constant of the SH wave which propagates through the clad. That is, the SH wave propagates through the clad as a clad mode having a propagation constant $\lambda_j$, and it is understood that the power of the SH wave can be expressed as the sum of the powers of these modes.

The power of the SH wave is greatly influenced by the term "F(λ)" in the equation (1), which is given by the equation (2):

$$F(\lambda) = \text{Real}\left\{ [iG(\lambda)] \times \left| \int_0^a J_0(r\zeta)J_0(ur)^2 r\,dr \right|^2 \right\} \quad (2)$$

(i: imaginary number)

It should be understood that to increase the value of F(λ), the value of the integral (so-called overlap integral)

$$\int_0^a J_0(r\zeta)J_0(ur)^2 r\,dr \quad (3)$$

(i: imaginary number)

has only to be increased. It is understood that the smaller the refractive index $n_G{}^{2\omega}$ of the SH wave compared with the refractive index $n_G{}^\omega$ of the primary light, i.e., $n_G{}^\omega \geq n_G{}^{2\omega}$, the more effective it is to increase the integral.

Due to the variance of the refractive index, however, the refractive index to light having a short wavelength is generally larger than that of light having a long wavelength. In general, the nonlinear optical crystal has anisotropy of the refractive index, and the condition $n_G{}^\omega \geq n_G{}^{2\omega}$ can be satisfied by properly utilizing the behavior of the refractive index to polarization. To do so, the plane of polarization of the fundamental wave should differ from that of the SH wave. In other words, if wavelength conversion is done with the electric field component of incident light different from that of the SH wave, the above condition can be realized. In such wavelength conversion, the non-orthogonal component of the nonlinear polarization tensor is utilized.

(2) Accordingly, the crystal orientation of the nonlinear optical crystal constituting the core is selected, and the non-orthogonal component of the nonlinear polarization tensor is utilized to execute the wavelength conversion.

It is to be noted that the nonlinear polarization is not proportional to the strength of the electric field. Although the polarization P of a material is sufficient to be treated over a linear region proportional to the electric field E of normal light, the polarization can be developed as follows as a complex function of E with respect to laser light having a high molecular density and B as a magnetic flux density:

$$P = \chi_1 E + \chi_2 EE + \chi_2 EEE + \ldots +$$
$$\chi_1' E(\nabla E) + \chi_1''(E \times B) +$$
$$\chi_3' EBB + \ldots$$
$$= \chi_1 E + P^{NL}$$

The terms following the second term inclusive are called "nonlinear polarization $P^{NL}$, $\chi_n$, $\chi_n'$ and $\chi_n''$ are tensors of the (n +1)th order, and are called "nonlinear sensitivity" excluding $\chi_1$.

As the nonlinear polarization of the crystal of the core used in the SHG, the secondary nonlinear polarization, $\chi_2 EE$, in $P^{NL}$ is used.

As shown in FIG. 4, with the dielectric main axis being Cartesian coordinates of xyz and the SHG placed with the core around the x axis, the nonlinear polarization in a case where laser light (linear polarization) has a vibrating surface parallel to the y axis is expressed as $P_2{}^{NL} = \chi_2 EE$. That is, $$\begin{bmatrix} P_x \\ P_y \\ P_z \end{bmatrix} = \begin{bmatrix} d_{11} & d_{12} & d_{13} & d_{14} & d_{15} & d_{16} \\ d_{21} & d_{22} & d_{23} & d_{24} & d_{25} & d_{26} \\ d_{31} & d_{32} & d_{33} & d_{34} & d_{35} & d_{36} \end{bmatrix} \begin{bmatrix} E_x^2 \\ E_y^2 \\ E_z^2 \\ 2E_y E_z \\ 2E_z E_x \\ 2E_x E_y \end{bmatrix} \quad (4)$$

With the secondary nonlinear polarization being a seed, an SH wave is generated. In other words, in a case where there is a $d_{32}$ tensor component of the secondary nonlinear polarization tensor $\chi_2$, when the primary light $E_y{}^\omega$ having a vibrating surface in the direction of the y axis as shown in FIG. 4, the nonlinear polarization is generated in the direction of the z axis. Given that the refractive index sensed by the primary light $E_y{}^\omega$ entering from the y axis is $n_y{}^\omega$ and the refractive index sensed by the SH wave $E_z{}^{2\omega}$ generated from the nonlinear polarization is $n_z{}^{2\omega}$, the above-described feature (1) or the core made of the nonlinear optical crystal that satisfies $n_y{}^\omega \geq n_z{}^{2\omega}$ has only to be used.

Figure 5:
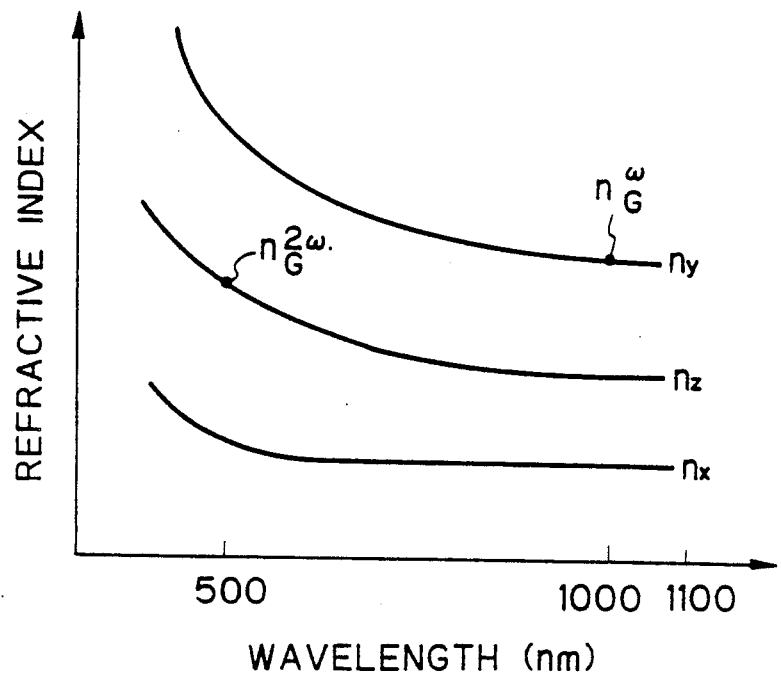
FIG. 5 is a graph of refractive index distribution curves of nonlinear optical crystal of the core of the SHG shown in FIG. 4.

If biaxial crystal is used as nonlinear optical crystal in the core, depending on the crystal orientation, this crystal has different main refractive index variance curves $n_x$, $n_y$ and $n_z$ ($n_y > n_z > n_x$) corresponding to the individual wavelengths with x, y and z being dielectric main axes normal to one another, as shown in FIG. 5. If the x axis of crystal having the $d_{23}$ component of $\chi_2$ is matched with the center axis of the core and the primary laser light (wavelength: 1000 nm) having a vibrating surface in the direction of the y axis enters this SHG, the desired SH wave (wavelength: 500 nm) having a vibrating surface in the direction of the z axis can be output.

From the above equation (4), therefore, for core of the biaxial crystal as nonlinear optical crystal, the relation between each of the non-orthogonal components of the secondary nonlinear polarization tensor and the direction of the vibrating surface of the incident primary light and the direction of the vibrating surface of the light of the SH wave emitted with the center being the core's center axis will be shown in Table 1 presented below. Of the main refractive index variance curves of the crystal core, pairs of main refractive index variance curves of the available core based on the mentioned relation are also given in the Table 1.

TABLE 1

| | Direction of incident vibrating surface | Core center axis | Direction of emission vibrating surface | Pair of refractive index of a core in use |
|---|---|---|---|---|
| $d_{12}$ | y | z | x | $n_y$, $n_x$ |
| $d_{13}$ | z | y | x | $n_z$, $n_x$ |
| $d_{21}$ | x | z | y | $n_x$, $n_y$ |
| $d_{23}$ | z | x | y | $n_z$, $n_y$ |
| $d_{31}$ | x | y | z | $n_x$, $n_z$ |
| $d_{32}$ | y | x | z | $n_y$, $n_z$ |

Figure 6:
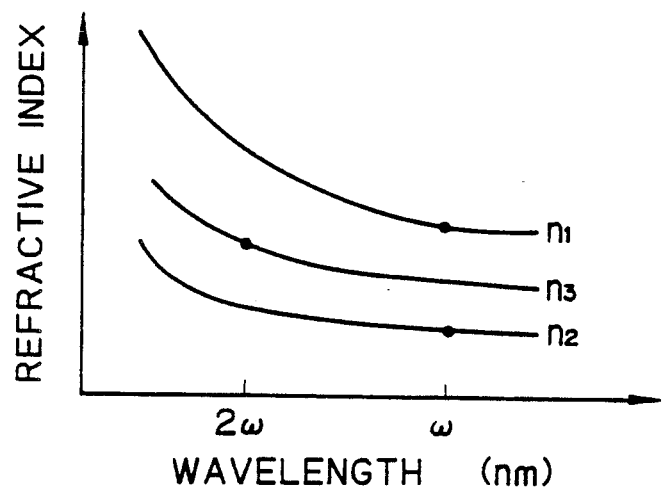
FIG. 6 is a graph of refractive index distribution curves of optical crystal of the core of another SHG.
Figure 7:
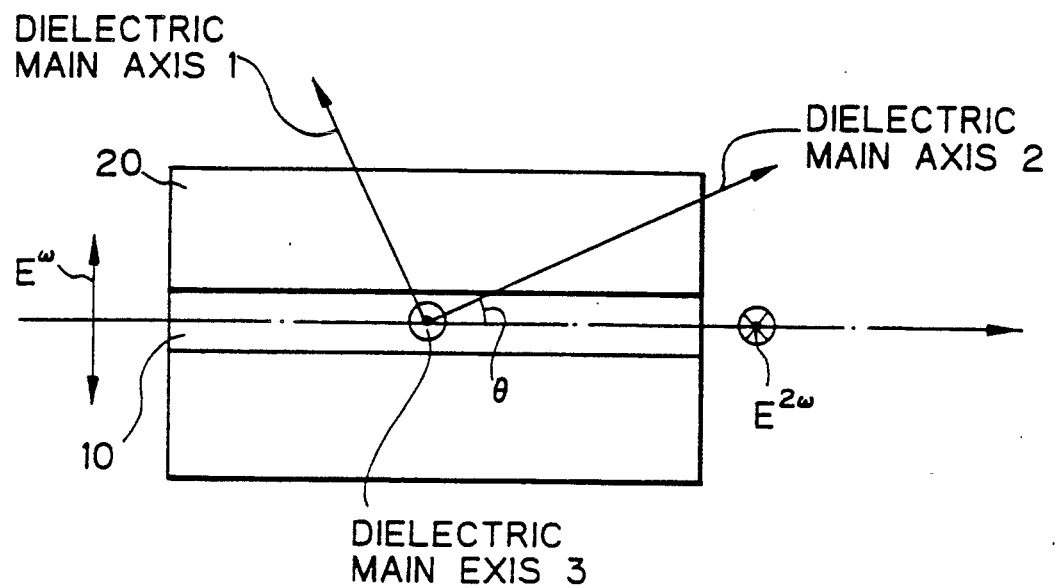
FIG. 7 is a partial cross-sectional view of the SHG shown in FIG. 6.

However, it is difficult to obtain an SHG whose core center axis always matches with the dielectric main axis, such as the x axis. The following depicts an example in a case where the biaxial crystal is used for the core and these axes do not match with each other. FIG. 6 exemplifies the refractive index variance curves of the biaxial crystal as nonlinear optical crystal. A material having the illustrated refractive indexes and having a large nonlinear polarization constant $d_{23}$, for example, can perform wavelength conversion most effectively if its crystal orientation is so done as to provide the relation between the dielectric main axes 1, 2 and 3 and the center axis of the core as shown in FIG. 7. The dielectric main axes 1, 2 and 3 normal to one another correspond to the x, y and z axes, and the association differs depending on the crystal. That is, the dielectric main axes 1, 2 and 3 may respectively correspond to the x axis, the y axis and the z axis in some case, and may respectively correspond to the y axis, the x axis and the z axis in some other case.

Even if one dielectric main axis 2 does not match with the core's center axis as shown in FIG. 7, the vibrating surface of the incident primary light can be rendered normal to the vibrating surface of the emitted SH wave. More specifically, as the core crystal is so grown as to make the dielectric main axis 3 normal to the core's center axis and the primary light is caused to enter the SHG in such a way that the vibrating surface of the emitted SH wave matches with the direction of the main axis 3, the refractive index $n_G{}^\omega$ that the linear polarization of the primary light senses from the other dielectric main axes 1 and 2 will be acquired by the following equation:

$$(n_G{}^\omega)^2 = \frac{1}{\frac{\cos^2\theta}{(n_1{}^\omega)^2} + \frac{\sin^2\theta}{(n_2{}^\omega)^2}}$$

($\theta$: angle formed by the core's center axis and dielectric main axis)

Therefore, $n_G{}^\omega \geq n_3{}^{2\omega}$ can be relized by altering the angle $\theta$ by which the core crystal is turned around the dielectric main axis 3.

(3) With the core made of biaxial crystal, the crystal orientation is controlled in such a manner as to make the crystal dielectric main axes 1 and 2 lie in the plane including the center axis of the core of the SHG and set the dielectric main axis 3 normal to the plane including the core's center axis, so that the refractive index $n_G{}^{107}$ to the fundamental wave in the core is determined by the refractive indexes $n_1{}^\omega$ and $n_2{}^{107}$ of the dielectric main axes 1 and 2 and the refractive index $n_G{}^{2\omega}$ of the core to the SH wave is determined by the refractive index $n_3{}^{2\omega}$ of the dielectric main axis 3.

Figure 8:
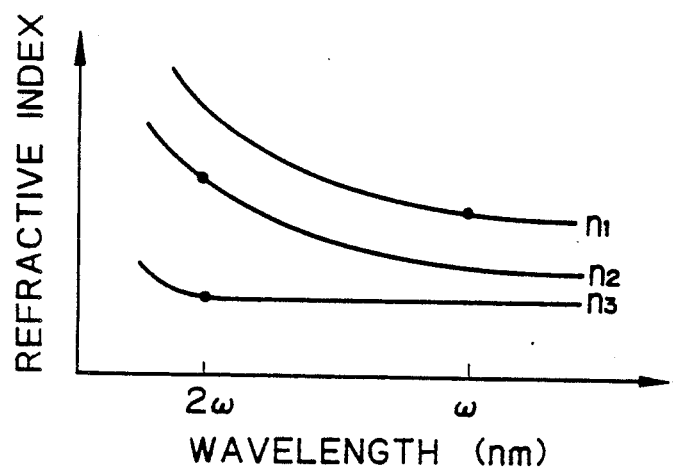
FIG. 8 is a graph of main refractive index distribution curves of biaxial crystal of the core of a further SHG.
Figure 9:
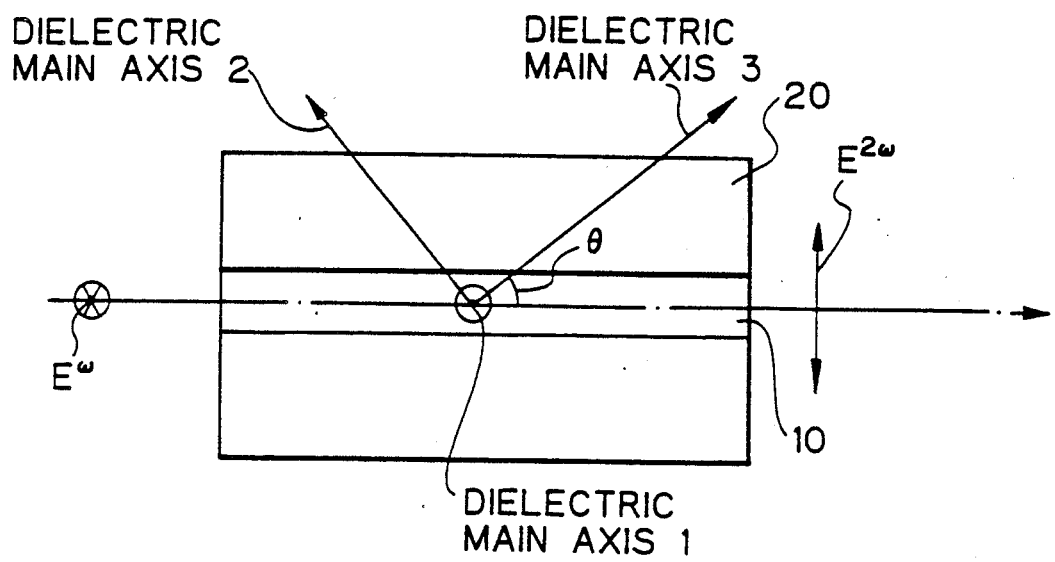
FIG. 9 is a partial cross-sectional view of the SHG shown in FIG. 8.

FIG. 8 exemplifies the refractive index variance curves of another biaxial crystal as nonlinear optical crystal. In this case, if the crystal orientation is done with the core's center axis matching with the dielectric main axis as shown in FIG. 4, the refractive index of this crystal at the vicinity of the wavelength of $2\omega$ on the curve $n_2$ is greater than the refractive index of the wavelength of $\omega$ on the curve $n_1$, i.e., $n_G{}^{107} < n_G{}^{2\omega}$. Therefore, improvement of the value of the integral in the aforementioned equation (3) cannot be expected, and the wavelength conversion efficiency will be reduced. If, with regard to the crystal orientation in the core, the dielectric main axis 1 is fixed and the dielectric main axes 2 and 3 are rotated by the angle $\theta$ as shown in FIG. 9, the refractive index $n_G{}^{2\omega}$ sensible by the SH wave to be emitted is determined from two refractive indexes $n_2$ and $n_3$ by the following equation $$(n_G{}^{2\omega})^2 = (n_2{}^{2\omega})^{-2}\sin^2\theta + (n_3{}^{2\omega})^{-2}\cos^2\theta$$

so that $n_G{}^{2\omega}$ can be reduced and $n_1{}^\omega \geq n_G{}^{2\omega}$ can be realized. More specifically, $n_1{}^\omega \geq n_G{}^{2\omega}$ can be realized if the core crystal is so grown as to make the dielectric main axis 1 normal to the core's center axis and to change the angle $\theta$ formed by the dielectric main axis 3 and the core's center axis, and if the primary light is caused to enter the SHG in such a way that the vibrating surface of the incident primary light matches with the direction of the dielectric main axis 1, as shown in FIG. 9.

(4) With the core made of biaxial crystal, the crystal orientation is controlled in such a manner as to make the crystal dielectric main axes 2 and 3 lie in the plane including the center axis of the core of the SHG and set the dielectric main axis 1 normal to the plane including the core's center axis, so that the refractive index $n_G{}^\omega$ to the fundamental wave in the core is determined by the refractive index $n_1{}^\omega$ of the dielectric main axis 1 and the refractive index $n_G{}^\omega$ of the core to the SH wave is determined by the refractive indexes $n_2{}^{2\omega}$ and $n_3{}^{2\omega}$ of the dielectric main axes 2 and 3.

(5) In the above-described features (3) and (4), the inclination of the dielectric main axis and the optical material for the clad are selected in the following manner. The inclination angle between the dielectric main axis and the center axis of the core of the SHG is selected to fall within such a range that the ratio of refractive index $n_{clad}{}^{2\omega}$ of the clad to the secondary light (SH wave) to the refractive index $n_{core}{}^\omega$ of the core to the fundamental wave, $n_{clad}{}^{2\omega}/n_{core}{}^\omega$, satisfies $1.00 \pm 0.01$. Further, the material for the clad is selected in such a way that the absolute value of the difference between the refractive index $n_{core}{}^{2\omega}$ of the core to the secondary light, and the refractive index $n_{clad}{}^\omega$ of the clad to the primary light (fundamental wave) is equal to or less than 0.05. This is because that if glass material for the clad is selected so that $n_{clad}{}^{2\omega}/n_{core}{}^\omega$ exceeds 1.01, the harmonics conversion efficiency will be lowered. Another reason is that if $n_{clad}{}^\omega/n_{core}{}^\omega$ is 0.99 or below, the optical wavelength converter would lack the reliability as follows: it becomes difficult to control the core diameter for which the valuable primary light to be waveguided is a single mode; the coupling efficiency of the primary light to the optical wavelength converter decreases, resulting in reduction of the conversion efficiency; or the coupling of the primary light to the optical wavelength converter becomes significantly sensible to the environmental conditions, such as a temperature change and external vibration.

EXAMPLES

SHGs were prepared as Examples 1 to 3, and in each Example, optical wavelength conversion were conducted with the power of the to-be-waveguided fundamental wave set to 30 40 mW.

EXAMPLE 1

When DAN (4-(N,N-dimethylamino)-3-acetamidonitrobenzene) is used for nonlinear optical crystal, YAG laser light having a 1064-nm wavelength is used as the fundamental wave and the crystal orientation is set as shown in FIG. 4. Then, $n_G{}^\omega = 1.843$, $n_G{}^{2\omega} = 1.732$ With optical glass SF1 used for the clad and the core radius set to 0.325 μm, and with a 1-mm long SHG, the conversion efficiency of 0.313% was acquired.

EXAMPLE 2

When DMNP (3,5-dimethyl-1-(4-nitrophenyl)-pyrazole) is used for nonlinear optical crystal, semiconductor laser light having a 870-nm wavelength is used as the fundamental wave and the crystal orientation is set as shown in FIG. 9. The x axis is tilted 35° to the center axis of the core of the SHG. Then, $n_G{}^\omega = 1.786$, $n_G{}^{2\omega} = 1.730$ With optical glass SF15 used for the clad and the core radius set to 0.475 μm, and with a 1-mm long SHG, the conversion efficiency of 1.5% was acquired.

EXAMPLE 3

When DMNP (3,5-dimethyl-1-(4-nitrophenyl)-pyrazole) is used for nonlinear optical crystal, semiconductor laser light having a 870-nm wavelength is used as the fundamental wave and the crystal orientation is set as shown in FIG. 9.

When the x axis is tilted 25° to the center axis of the core of the SHG, $n_G{}^\omega = 1.786$, $n_G{}^{2\omega} = 1.7674$ With optical glass SF4 used for the clad and the core radius set to 0.7 μm, and with a 1-mm long SHG, the conversion efficiency of 1.0% was acquired. At this time, $n_{clad}{}^{2\omega}/n_{core}{}^\omega = 1.003$ According to the present invention, as described above, since the refractive index to the SH wave is made smaller than the refractive index to the primary light by selecting one of the dielectric main axes of the core material and conducting the crystal orientation to rotate the other two dielectric main axes around the selected one, the output level of the SH wave can be improved.

What is claimed is:

1. A fiber-type optical wavelength converter comprising:
   a core made of a biaxial nonlinear optical crystal having,
      a first longitudinal refractive index ($n_{core}{}^\omega$) to a fundamental wave in the extending direction of the core,
      a first dielectric main axis,
      a second dielectric main axis oblique to the core and normal to said first dielectric main axis,
      a third dielectric main axis normal to the core and said first and second dielectric main axes, and
      a crystal orientation defined by the following equation:

$$(n_{core}^\omega)^2 = \frac{1}{\frac{\cos^2\theta}{(n_1^\omega)^2} + \frac{\sin^2\theta}{(n_2^\omega)^2}}$$

where $n_{core}{}^\omega$ represents said first longitudinal refractive index, $\theta$ represents an angle formed by the core and said second dielectric main axis, $n_1{}^\omega$ represents a first refractive index to the fundamental wave in said first dielectric main axis, and $N_2{}^\omega$ represents a second refractive index to the fundamental wave in said second dielectric main axis, so as to satisfy the following inequality, $$n_{core}{}^\omega \geq n_3{}^{2\omega}$$

where $n_3{}^{2\omega}$ represents a third refractive index of the core to a second harmonics in said third dielectric main axis; and
   a clad surrounding said core,
   whereby a fundamental wave of straight polarization having a vibrating surface normal to said third dielectric main axis having a frequency of $\omega$ entering and propagating along the core is converted into a second harmonics having a vibrating surface parallel to said third dielectric main axis and having a frequency of $2\omega$.

2. A fiber-type optical wavelength converter according to claim 1, wherein said clad is made of an optical glass having a refractive index satisfying a ratio of the following equation:

$$n_{clad}{}^{2\omega}/n_{core}{}^\omega = 1.00 \pm 0.01$$

where $n_{clad}{}^{2\omega}$ represents a refractive index of the clad to a second harmonics, and $n_{core}{}^\omega$ represents a refractive index of the core to a fundamental wave.

3. A fiber-type optical wavelength converter according to claim 2, wherein the optical glass of said clad is selected from materials satisfying that the absolute value of the difference between a refractive index $n_{core-2\omega}$ of the core to the secondary harmonics and a refractive index $n_{clad}{}^\omega$ of the clad to the fundamental wave light is equal to or less than 0.05.

4. A fiber-type optical wavelength converter comprising:
   a core made of a biaxial nonlinear optical crystal having,
      a second longitudinal refractive index ($n_{core}{}^{2\omega}$) to a secondary harmonics in the extending direction of the core,
      a first dielectric main axis normal to the core,
      a second dielectric main axis normal to said first dielectric main axis,
      a third dielectric main axis oblique to the core and normal to said first and second dielectric main axis, and
      a crystal orientation defined by the following equation:

$$(n_{core}{}^{2\omega})^2 = (n_2{}^{2\omega})^{-2}\sin^2\theta + (n_3{}^{2\omega})^{-2}\cos^2\theta$$

where $n_{core}{}^{2\omega}$ represents said second longitudinal refractive index, $n_2{}^{2\omega}$ represents a second refractive index to the secondary harmonics in said second dielectric main axis, $n_3{}^{2\omega}$ represents a third refractive index to the secondary harmonics in said third dielectric main axis, $\theta$ represents an angle formed by the core and said third dielectric main axis, so as to satisfy the following inequality, $$n_{core}{}^\omega \geq n_{core}{}^{2\omega}$$

where $n_{core}{}^\omega$ represents a first refractive index of the core to a fundamental wave in said first dielectric main axis; and a clad surrounding said core,
whereby a fundamental wave of straight polarization having a vibrating surface parallel to said first dielectric main axis having a frequency of $\omega$ entering and propagating along the core is converted into a second harmonics having a vibrating surface normal to said first dielectric main axis and having a frequency of $2\omega$.

5. A fiber-type optical wavelength converter according to claim 4, wherein said clad is made of an optical glass having a refractive index satisfying a ratio of the following equation:

$$n_{clad}^{2\omega}/n_{core}^{\omega} = 1.00 \pm 0.01$$

where $n_{clad}^{2\omega}$ represents a refractive index of the clad to a second harmonics, and $n_{core}^{\omega}$ represents a refractive index of the core to a fundamental wave.

6. A fiber-type optical wavelength converter according to claim 5, wherein the optical glass of said clad is selected from materials satisfying that the absolute value of the difference between a refractive index $n_{core}^{2\omega}$ of the core to the secondary harmonics and a refractive index $n_{clad}^{\omega}$ of the clad to the fundamental wave light is equal to or less than 0.05.

* * * * *

UNITED STATES PATENT AND TRADEMARK OFFICE
CERTIFICATE OF CORRECTION

PATENT NO. : 5,138,686

DATED : August 11, 1992

INVENTOR(S) : Kiyofumi CHIKUMA et al.

It is certified that error appears in the above-identified patent and that said Letters Patent is hereby corrected as shown below:

In col. 10, line 1, change "$N_2^\omega$" to --$n_2^\omega$--;

line 65, change "$n_{core}^{107} \geq n_{core}^{2\omega}$" to

--$n_{core}^\omega \geq n_{core}^{2\omega}$--.

Signed and Sealed this

Twenty-third Day of November, 1993

Attest:

BRUCE LEHMAN

*Attesting Officer*   *Commissioner of Patents and Trademarks*